Sept. 8, 1959 V. E. MATULAITIS 2,903,557
ARC MACHINING WITH BAND ELECTRODE
Filed Dec. 26, 1957
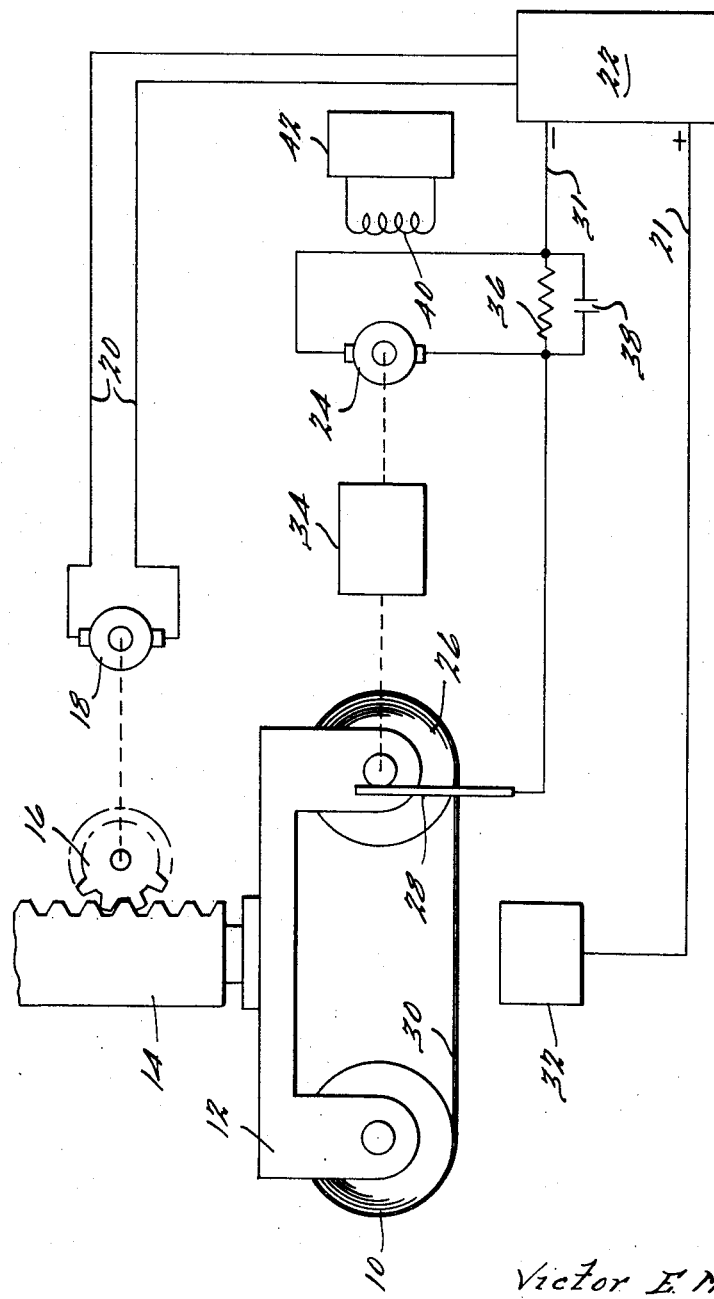
INVENTOR.
Victor E. Matulaitis
BY M K Murphy
ATTORNEY.

United States Patent Office 2,903,557
Patented Sept. 8, 1959

---

2,903,557

ARC MACHINING WITH BAND ELECTRODE

Victor E. Matulaitis, Franklin, Mich., assignor to Elox Corporation of Michigan, Royal Oak, Mich., a corporation of Michigan Application December 26, 1957, Serial No. 705,161

8 Claims. (Cl. 219—69)

This invention relates to the art of electrical-discharge-machining, sometimes referred to as "spark-machining" or "arc-machining" and called herein "EDM."

As is well known in the art, EDM consists essentially of providing an electrode and a power supply and disposing the electrode in predetermined space relationship with a workpiece and causing intermittent electrical discharge across the gap therebetween in the presence of a dielectric coolant.

It has been proposed to cut or saw hard materials such as tool steel, tungsten carbide and the like, by using a wire electrode. Rudorff Patent No. 2,526,423 shows one example. Attempts to put the scheme suggested in the Rudorff patent into practical commercial use have failed for several reasons. One reason for failure has to do with the excessive electrode wear which necessitates impractically large spools of wire for the electrode, which large spools are too unwieldly to be fed properly and are very expensive.

For example, in EDM, electrode wear bears a direct relation to amount of stock removal from the workpiece. Let it be assumed that the workpiece is tungsten carbide of one square inch cross-section and that the electrode is brass wire of .020 diameter. Neglecting the "overcut" due to the length of the gap, the volume of carbide removed in one cut through the piece is $$1 \times 1 \times .020 = .020 \text{ cubic inch}$$

The volume of brass wire consumed will be approximately three times the stock removed from the workpiece (.060 cubic inch) inasmuch as the wear ratio when machining tungsten carbide with brass is about 3 to 1. Assuming that it is practical to reduce the diameter of the electrode wire by 50 percent during the machining operation, then the cross-sectional area of the original wire is:

$$A = \pi \times .010^2 = .00031416 \text{ square inch}$$

Since half of this cross-sectional area is to be lost during the machining, the wire length required is:

$$L = \frac{.060}{\frac{.00031416}{2}}$$

$$L = 382 \text{ inches}$$

It is apparent that such a length of wire would require large spools with consequent bulk and weight which render the method impractical.

Atttempts to avoid this condition by causing a shorter length of wire to pass endlessly across the gap have been unsuccessful because the cross section of the wire changes, resulting in the machined slot being of variable width, which cannot be tolerated in precision machining.

Accordingly, it is the primary object of my invention to provide an improved means and method for utilizing wire electrodes for EDM.

Another object is to improve the accuracy of cutting with wire electrodes.

A still further object is to provide, in apparatus of the type described, means for stopping passage of wire through the gap when no machining is taking place.

A further object is to provide means for regulating the rate of wire traversal in such manner that a predetermined fixed length of wire is passed through the gap regardless of whether light or heavy cutting is taking place.

Other objects and advantages will become apparent from the following specification which, taken in conjunction with the accompanying drawing, describes a preferred embodiment of the invention.

In the drawing, in which reference characters have been used to designate like parts referred to herein, I have shown schematically an apparatus and circuitry for carrying out the aforesaid objects.

Referring to the drawing, it may be seen that the electrode wire spools are carried by a head 12 which is, in turn, carried by a quill 14. The latter is suitably mounted such that it may be fed toward the workpiece and retracted therefrom by means of an automatic power feed apparatus which includes a pinion 16 and a reversible motor 18. The motor is supplied with power through conductors 20 which connect with the main power supply 22.

For purposes of simplification, details of the automatic power feed have been omitted because they are only incidental to the invention. It is deemed sufficient to state that the servo-motor 18 under control of means included in the power supply 22 will automatically adjust the position of the head 12 such that the wire electrode 30 will be fed into the workpiece 32 and will be maintained in optimum machining relationship therewith.

The workpiece 32 will in most instances be immersed in a dielectric coolant circulated by a pump, as is the practice in the art.

The head 12 mounts spools 10 and 26 on which the wire electrode 30 is wound. In the arrangement shown, the wire 30 is initially wound on spool 10 and is transferred to spool 26 during cutting, the spool 26 being rotated by motor armature 24 and speed reducer 34 through a suitable flexible drive transmission, or if preferred the motor and speed reducer 34 may be mounted on the head 12.

Preferably means is provided for retarding rotation of spool 10 so that the wire will be under tension and for guiding the wire such that the wire travels in a fixed straight line in its passage from one spool to the other.

Power is applied to the machining gap between the electrode 30 and the workpiece 32 from the power supply 22 through conductors 21 and 31. The conductor 21 connects the positive terminal of the power supply directly to the workpiece 32. The conductor 31 connects the negative terminal of the power supply with the wire electrode 30 by means of a brush 28. The power supply 22 preferably comprises a bank of vacuum tubes controlled by a pulser or multi-vibrator as described in my co-pending application Serial No. 669,803, filed July 3, 1957.

Interposed in conductor 31 between the power supply and the electrode is a network consisting of a resistor 36 and a condenser 38 connected in parallel. This network may be, if desired, connected in the positive lead 21.

The armature 24 is connected across the paralleled resistor-condenser network. It will be seen then that the network functions as a current measuring shunt—the voltage across the network being directly proportional to gap current. The field 40 of the motor is supplied from a suitable direct current power source 42.

Machining rate (and electrode wear) is directly proportional to the current flowing in the gap between the electrode 30 and the workpiece 32; therefore the voltage across condenser 38 will vary in accordance with gap current and thus will be proportional to wear of the wire electrode. Since the armature 24 is part of a shunt D.C. motor, its speed of rotation will vary with applied armature voltage.

It may be seen then that the rotational speed of the armature 24 and consequently the rate of traversal of the wire 30 will be directly proportional to the rate of cutting of the workpiece. By proper matching of motor characteristics, reduction gear 34 and spool sizes, and by proper selection of the values of condenser 38 and resistor 36, almost any desired reduction in cross section of the wire electrode may be effected. No wire will be fed when cutting is not taking place, and if provision is made for turning off the power supply to the gap during short-circuit conditions, as described in my issued Patent Number 2,769,078, no wire will be fed during the period of the short-circuit.

I have described only the preferred form of my invention and by so doing, do not intend to limit the same to the exact arrangement shown in the schematic drawing. It will be obvious to those skilled in the art to make changes where necessary such as supplying an amplifier between the armature 24 and the network 36, 38, if necessary, etc.

I claim:

1. In an electrical-discharge-machining apparatus, an electrode comprising a length of wire, a feed reel and a take-up reel disposed in spaced relationship, means for rotating said reels for traversing said wire from one reel to the other, means for disposing said reels such that the length of wire between reels may be fed toward a workpiece, a power supply connected to the electrode and workpiece for causing intermittent electrical discharge across the gap between the same, and means controlling said reel rotating means operable to vary the speed thereof in accordance with the current through said gap.

2. In an electrical-discharge-machining apparatus having a traversing wire electrode, a motor for traversing said wire, a power source for supplying power pulses to the gap between the electrode and a workpiece, means connecting said motor to said power source such that the speed of said motor is directly proportional to the average current through said gap.

3. In an electrical-discharge-machining apparatus having a traversing wire electrode, a motor for traversing said wire, a power source for supplying power pulses to the gap between the electrode and a workpiece, a resistor connected in one lead of said power source, a condenser connected in parallel with said resistor and means connecting the armature of said motor across said condenser.

4. In combination with means for cutting a slot in a conductive workpiece by electrical-discharge-machining, a traversing wire electrode, means for disposing said electrode in machining relationship with the workpiece and for causing intermittent electrical discharge therebetween, means including an electric motor for continuously traversing said wire electrode during machining, and means controlling the speed of said motor operable in response to changes in average current flowing across said gap to vary the speed of electrode traversal in direct proportion to the rate of machining.

5. In combination with means for cutting a slot in a conductive workpiece by electrical-discharge-machining, a traversing wire electrode, means for disposing said electrode in machining relationship with the workpiece and for causing intermittent electrical discharge therebetween, means including an electric motor for continuously traversing said wire electrode during machining, and means controlling the speed of said motor operable in response to changes in average current flowing across said gap to vary the speed of electrode traversal such that erosion of said electrode will be directly proportional to erosion of the workpiece.

6. In combination with electrical-discharge-machining apparatus having a wire electrode for cutting a conductive workpiece and in which the erosion of said electrode bears a direct relation to the erosion of the workpiece, means for traversing the electrode during machining, and means for varying the speed of traversal in relation to the rate of machining comprising an electric motor and means for varying the motor speed in accordance with changes in average machining current.

7. In combination in an electrical-discharge-machining apparatus having means for disposing an electrode in gap relation to a workpiece and means for passing intermittent electrical discharge across said gap for eroding said workpiece, a wire electrode, means for traversing the electrode during machining and means for predetermining the length of wire that will pass across said gap to remove a selected volume of workpiece material comprising an electric motor for traversing said wire and means for varying the speed of said motor in accordance with machining current.

8. In combination in an electrical-discharge-machining apparatus having means for disposing an electrode in gap relation to a workpiece and means for passing intermittent electrical discharge across said gap for eroding said workpiece, a wire electrode, means for traversing the electrode during machining and means for predetermining the length of wire that will pass across said gap to remove a selected volume of workpiece material comprising an electric motor for traversing said wire and means for varying the speed of said motor in accordance with machining current, said last means comprising a resistor-capacitance network connected in series with said gap and means connecting the armature of said motor across said network.

References Cited in the file of this patent

UNITED STATES PATENTS

| | | |
|---|---|---|
| 2,794,110 | Griffith | May 28, 1957 |
| 2,802,929 | Fefer et al. | Aug. 13, 1957 |

FOREIGN PATENTS

| | | |
|---|---|---|
| 748,544 | Great Britain | May 2, 1952 |